Dec. 1, 1925.  1,563,606
G. WILLIAMS
WINDSHIELD
Filed July 6, 1925
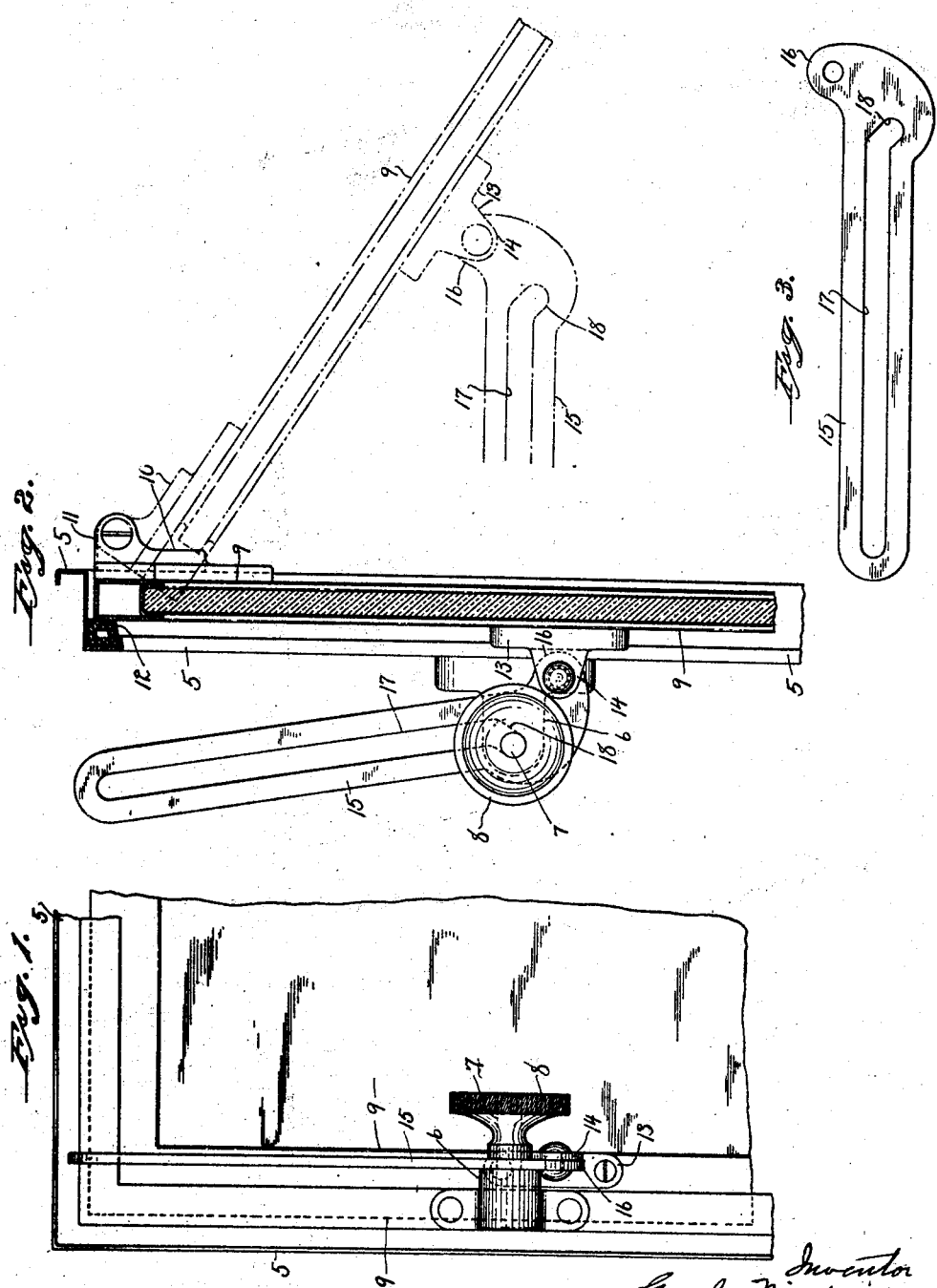

Patented Dec. 1, 1925.

1,563,606

UNITED STATES PATENT OFFICE.

GORDON WILLIAMS, OF MOUNT CARMEL, CONNECTICUT.

WINDSHIELD.

Application filed July 6, 1925. Serial No. 41,519.

*To all whom it may concern:*

Be it known that I, GORDON WILLIAMS, a citizen of the United States, residing at Mount Carmel, in the county of New Haven and State of Connecticut, have invented a new and useful Improvement in Windshields; and I do hereby declare the following, when taken in connection with the accompanying drawings and the characters of reference marked thereon, to be a full, clear, and exact description of the same, and which said drawings constitute part of this application, and represent, in—

Fig. 1 an inside view of one side of a wind-shield constructed in accordance with my invention.

Fig. 2 a vertical, sectional view of the same, showing the movable member extended in broken lines.

Fig. 3 a plan view of the link detached.

This invention relates to improvement in wind-shields, and particularly to devices for holding the swinging-member of a wind-shield in its locked position, as well as in various positions of open adjustment, and particularly to devices of this character including a slotted link secured to the movable-member and engaging with a stud on the main frame. The object of the invention is to so form the link that when the movable-member or panel is in its closed position, it will itself form a positive lock, and the invention consists in the construction as hereinafter described and particularly recited in the claims.

In carrying out my invention, I employ the usual enclosing-frame 5, to which is secured brackets 6 carrying inwardly-projecting threaded studs 7 for the reception of clamping-nuts 8. The movable-panel or shield 9 is provided on its upper outer faces with brackets 10, and the enclosing-frame is also provided on its outer face at the upper corners with brackets 11, the brackets 10 and 11 being connected together, so as to hinge the swinging-member to the enclosing-frame, the frame, when in closed position, bearing against the usual rubber cushion 12. Secured to the movable-member on opposite sides are brackets 13 with offsets 14, to which links 15 are pivoted, the link being provided, at its lower end, with an offset-finger 16. The link is formed with a longitudinal slot 17 to set over the stud 7, and the lower end of the link is formed with an inwardly-offset recess 18. By forming the offset 18 when the movable-member approaches its closed position, this offset acts as a cam, so that, when the upper end of the link is moved outward, toward the enclosing-frame, the movable-member will be drawn into its fully closed position and owing to the fact that the inwardly-extending offset 18 is above the pivot-point of the link, a positive lock is formed.

In any of its open positions, the movable-member is held by turning the nut 9, so as to clamp the links against the brackets 6, and of course these nuts can be turned to a seat when the movable-member is in its closed position, although this is not necessary in order to clearly lock the movable-member in its closed position.

I claim:

1. In a wind-shield, the combination with the enclosing-frame, of a movable-member hinged thereto, a link pivotally connected with the movable-member, said link provided at its lower end with an outwardly-projecting finger through which the link is hinged, said link formed with a longitudinal slot provided at its lower end with an inwardly-offset recess, a stud mounted on the frame and extending through the slot in the said link.

2. In a wind-shield, the combination with the enclosing-frame provided at its upper outer corners with brackets, a movable-member provided at its upper outer corners with brackets which are pivotally connected with the brackets on the frame, brackets secured to the sides of the frame, links pivoted to the sides of the movable-member, links provided with outwardly-extending fingers pivotally connected with the brackets on the movable-member, said link formed with a longitudinal slot terminating in an inwardly-extending recess, the end of the recess being above the pivotal-point of the link, brackets secured to the inner face of the enclosing-frame and provided with threaded studs projecting through the slots in the links, and nuts applied to said studs.

In testimony whereof, I have signed this specification.

GORDON WILLIAMS.